(12) United States Patent
Argillier et al.

(10) Patent No.: US 6,410,671 B1
(45) Date of Patent: Jun. 25, 2002

(54) ZWITTERION DERIVATIVE AND APPLICATION TO AQUEOUS SUSPENSION PROPERTIES

(75) Inventors: Jean-François Argillier, Saint Cloud; Annie Audibert-Hayet, Croissy sur Seine; Pierre Le Perchec; Pierre Louis Carrette, both of Lyons, all of (FR)

(73) Assignee: Institute Francais du Petrole, Rueil-Malmaison cedex (FR)

(*) Notice: Subject to any disclaimer, the term of this patent is extended or adjusted under 35 U.S.C. 154(b) by 0 days.

(21) Appl. No.: 09/743,216

(22) PCT Filed: Jun. 15, 1999

(86) PCT No.: PCT/FR99/01438

§ 371 (c)(1),
(2), (4) Date: Apr. 13, 2001

(87) PCT Pub. No.: WO00/01746

PCT Pub. Date: Jan. 13, 2000

(30) Foreign Application Priority Data

Jul. 6, 1998 (FR) .............................................. 98/08722

(51) Int. Cl.$^7$ .............................................. C08F 120/54
(52) U.S. Cl. .................. 526/306; 526/278; 526/287; 526/303.1; 526/304; 526/321; 526/328
(58) Field of Search ................. 526/278, 287, 526/303.1, 304, 306, 321, 328

(56) References Cited

U.S. PATENT DOCUMENTS 3,836,537 A * 9/1974 Boerwinkle et al. . 260/29.6 HN
4,704,229 A * 11/1987 Brunel et al. ................ 252/352

FOREIGN PATENT DOCUMENTS

| | | | |
|---|---|---|---|
| EP | 0 283 817 A | * | 9/1988 |
| FR | 2 572 078 | * | 4/1986 |
| GB | 2 260 985 | * | 5/1993 |

* cited by examiner

Primary Examiner—Helen L. Pezzuto
(74) Attorney, Agent, or Firm—Antonelli, Terry, Stout & Kraus, LLP

(57) ABSTRACT

The present invention relates to more or less substituted acrylamide or acrylate and zwitterion monomer hydrosoluble copolymers. The polymers have the general structure as follows:

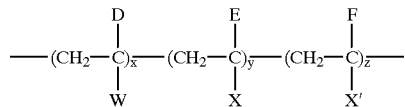

X and X' comprise a $N_+$—$R_1$—$Z^-$ betaine, with $Z^-$ meeting at least one of the following formulas, corresponding to sulfobetaines and phosphobetaines respectively:

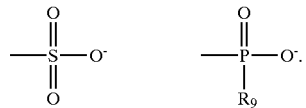

13 Claims, No Drawings

ZWITTERION DERIVATIVE AND APPLICATION TO AQUEOUS SUSPENSION PROPERTIES

FIELD OF THE INVENTION

The present invention relates to new hydrosoluble zwitterion polymers, and to the preparation and uses thereof.

Owing to their compositions and to their molar masses, hydrosoluble polymers of synthetic or natural origin are commonly used at low concentrations as modifying agents for modifying the properties of aqueous solutions and, by action on suspended particles, as modifying agents for modifying surface properties.

In this respect, the use of polycationic polyelectrolytes of dialkylammonium polyalkylene type is notably known, which provide aqueous solutions and polyanionic hydrosoluble polymers such as sodium sulfonate polynaphthalenes or polyacrylates, which allow dispersion of minerals in water, with a high viscosifying effect.

Their use involves certain limitations linked with the sensitivity and the instability of the solutions, notably in the presence of salts or as a result of a temperature rise and, in some cases, because of their harmful effect on the environment.

The zwitterion hydrosoluble polymers of the present invention prove to be efficient as viscosifying agents for aqueous solutions within a wide salinity and temperature range and as modifying agents for the surfaces of particles in aqueous suspensions, and they are furthermore better accepted on account of a better environmental compatibility.

The applications of this type of zwitterion hydrosoluble polymers are those which are generally used in the petroleum industry as oil well fluids, in the paint industry as pigment compatibilizing additives, in the cosmetics and paper industry and, without restricting the use thereof, as treating agents for clays in the photographic film industry and for drilling muds notably. They are also used as rheology control agents for aqueous suspensions.

On account of their structure, the polymers according to the invention can also have properties of drag reducer additives for the flow of certain fluids, notably on eddy flow. These additive types limit the friction of fluids on the walls.

For the formulation of oil well fluids, drilling fluids and completion or production fluids, potential applications can be mentioned such as, for example, the filtrate reducing effect, the clay swelling inhibiting effect, the cuttings or clays crumbling inhibiting effect. The performance level of the zwitterion hydrosoluble polymer defied in the invention will then have to be selected according to the application and therefore to the desired properties.

BACKGROUND OF THE INVENTION

The polymers conventionally used in water-base fluids are acrylamide derivatives, generally acrylamide/acrylate copolymers obtained by copolymerization of acrylamide and acrylate or by polyacrylamide hydrolysis.

They are however sensitive to the conditions of use that can be encountered. A high shear gradient, a high bottomhole temperature lead to a decrease in their molar mass and in their viscosifying power. Furthermore, they are sensitive to media with high ionic strengths because of the presence of carboxylate or sulfonate groups which also lead to a loss of their viscosifying power or even to a precipitation of the molecules in media with high divalent ions concentrations.

For applications in saline media, polyampholytes carrying both positive charges and negative charges can be suitable.

When the charges are in equal number (neutral polyampholytes) and the proton exchange is suppressed, the properties in aqueous solution of these products are governed by the attractive forces that exist between the unlike charges. They are generally more soluble and they have higher viscosities in a saline medium than in deionized water. The behaviour of this type of polymer is therefore referred to as antipolyelectrolyte behaviour.

In the case of polyampholytes that do not have the same number of positive and negative charges, according to the extent of the excess of one charge type in relation to the other, it is the polyelectrolyte effect or the neutral polyampholyte effect that characterizes the behaviour in solution (Corpart et al., *Macromolecules*, 1993, 26 (6), 1333).

These products are already mentioned for many applications, in particular for the formulation of cleaning compounds, cosmetic applications, the latter depending on the nature of the zwitterion, on their composition and on the molar mass of the polymer.

When the monomer comprises exactly an ammonium group and an anionic function, it belongs to the betaine family and the charges form an inner salt. A distinctive feature of the polymers of the invention is that the unlike charges are on the same side group of betaine type. These are electrically neutral polymers. The positive charge is provided by a quaternary ammonium function, the negative charge by a sulfonate (sulfobetaines) or phosphonate (phosphobetaines) group.

Some copolymers were obtained by copolymerization of acrylamide with carboxybetaine type monomers (Kathmann et al., *Polymer*, 1997, 38 (4), 871). Their properties in solution greatly depend on the pH value and they are incompatible with the desired properties. In fact, at a low pH value, the protonation of the carboxylate functions leads to the loss of the zwitterionic character and the copolymer behaves like a cationic polyelectrolyte, thus sensitive to the presence of salt in particular.

The polybetaines described here have the advantage of keeping their zwitterionic character within a wide pH range. Certain acrylaride and sulfobetaine copolymers have already been described, but they result from synthesis processes carried out in the presence of salts, which is of notable importance for the structures obtained. <<Hydrophilic sulphobetaine copolymers of acrylamide and 3-(2-acrylamido-2-methylpropanedimethylammonio)-1-propanesulphonate>> by L. Cormick et al.—POLYMER, 1992, Volume 33, Number 21.

SUMMARY OF THE INVENTION

The object of the invention relates to the synthesis and to the properties in solution of zwitterion copolymers. Zwitterionomer copolymers copolymerized with a more or less substituted acrylamide or acrylate correspond to the description of the general formula defined hereafter.

The general structure of the polymers is as follows:

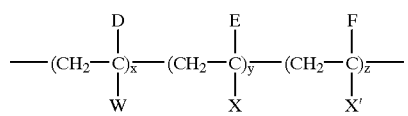

W is a $CONH_2$ or $CONHR$ or $CONRR'$ or $COO^-$ or $COOR''$ group, where R, R' and R" are linear or branched aliphatic radicals, x, y, z are molar percentages, y+z not equal to zero, D, E and F are an atom of hydrogen or a methyl group,
X and X' correspond to one of the following two formulas:

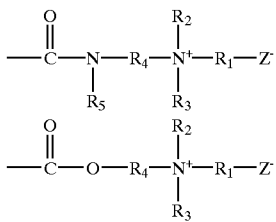

R$_2$ and R$_3$ are each a monovalent hydrocarbon radical,

R$_1$ is a divalent organic group comprising a linear chain consisting of carbon atoms, containing 3 to 12 atoms in linear chain, that can be interrupted by 1 nitrogen atom carrying an amide function or by 1 to 3 oxygen atoms and comprising possibly alkyl or hydroxyl substituents, R$_4$ is a linear or branched aliphatic group and R$_5$ is a hydrocarbon radical, Z$^-$ meets at least one of the following formulas corresponding to sulfobetaines and phosphobetaines respectively:

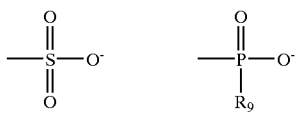

R$_9$ is a methyl, phenyl or alkoxy radical, in cases where synthesis of the polymers is carried out in the absence of salts:

(y+z) max=40%, in the case of phosphobetaines and of synthesis in the presence of salts:

(y+z) max=100%.

In the case of sulfobetaines, R$_1$ can be one of the following two formulas:

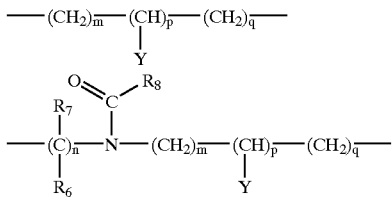

wherein R$_6$ and R$_7$ represent each a substantially hydrocarbon radical and R$_8$ a hydrogen atom or a hydrocarbon radical; n, m, p, q integers, n is 2 or 3; Y can be a methyl or hydroxyl group; p can be 0 or 1.

When Y is a hydroxyl group, p is 1, m is 1 and q is 1.

When Y is a methyl group, p is 1, m is 2 and q can be 0 or 1.

If p is 0, the sum m+q is 2, 3 or 4.

In the case of phosphobetaines, R$_1$ can correspond to one of the following four formulas:

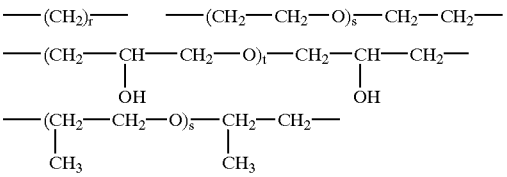

r is an integer between 3 and 12, s is an integer between 1 and 3 and t is an integer that can be 1 or 2.

Synthesis of the Zwitterion Hydrosoluble Polymers

The general principle of the synthesis of the polymers of the invention, only limited by the term hydrosolubility, consists in polymerizing one or more monomers, at least one of them being zwitterionic, which goes into the composition of the initial copolymerization mixture. The polymer is obtained according to a known polymerization process in aqueous solution in the presence of a hydrosoluble radical polymerization initiator which can be potassium persulfate.

Synthesis of zwitterion monomers whose polar head nature (carboxylate, sulfonate, phosphonate), hydrocarbon skeleton structure, substituents nature, intercharge distances and polymerizable group nature can be adjusted by taking as the reference synthesis methods known from the prior art is intended to produce new zwitterion compounds, which are new in particular for their polymerizable nature (documents U.S. Pat. No. 4,704,229 and FR-2,572,078).

The operation of co- or ter-polymerization of two or more comonomers is then carried out by preparing comonomer mixtures placed in a reactor that is stirred and whose temperature is thermostat-controlled to allow completion of the copolymerization. The selected zwitterionomer compositions range between 0 and 100%, preferably between 0.1 and 40%, and in particular between 1 and 10%. The copolymerization temperature set at between 25 and 90° C., preferably between 35 and 60° C., is so determined as to obtain a copolymer after less than ten hours' reaction and preferably between 1 and 3 hours' reaction for conversion rates of the order of 10 to 80%, which are limited by the viscosity of the reaction medium.

EXAMPLES

Sulfobetaine and phosphobetaine type monomers were prepared and copolymerized with acrylamide. This method allows to control the molar mass and the incorporation of the zwitterionic units.

Within the scope of the present invention, the synthesized monomers and copolymers are salt-free. It has been shown that this process allows to control the structure of the products thus obtained, as well as their properties in solution. The products thus obtained according to the invention were characterized by NMR$^1$H and $^{13}$C. Two devices were used: a BRUKER AC 250 and a BRUKER DRX 400 working in $^1$H at 250.13 MHz and 400.13 MHz respectively, and in $^{13}$C at 62.89 MHz and at 100.62 MHz respectively. The measurements were performed at 294 K. The chemical displacements (δ) of the signals described are expressed in ppm in relation to the TMS in CDCl$_3$ and CD$_3$OD and to the TSPd$_4$(3-trimethylsilyl-2,2',3,3'-d$_4$-sodium propionate) in D$_2$O (the value of its chemical displacement in NMR $^{13}$C at 294 K is −2.35). The abbreviations used for NMR $^1$H are: s: singlet; d: doublet; t: triplet; q: quadruplet; qt: quintuplet; m: multiplet, and they correspond to what is observed on the spectra.

I) Synthesis of Zwitterionic Monomers

Example 1

Synthesis of 3-[(3-acrylamidopropyl) dimethylammonio]propanesulfonate

1$^{st}$ Stage

This first stage is carried out in the absence of salts.

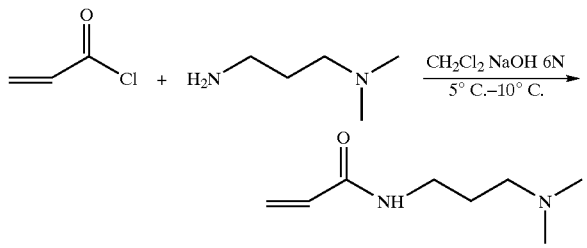

12.6 ml 3-aminopropyldimethylamine (M=102.18 g/mol-d=0.812–0.1 mol) are added to the mixture comprising 80 ml dichloromethane and 25 ml solution of 6N sodium hydroxide stirred magnetically. The temperature of the reaction medium is lowered to 5° C. The solution of 8.45 ml acryloyle chloride (M=90.51 g/mol-d=1.114–1.04 eq) in 20 ml dichloromethane is then added in an argon stream, the temperature being to maintained below 10° C. Stirring is continued for one hour after the end of the addition operation. The organic phase is then separated from the aqueous phase and dried on sodium sulfate. After evaporation of the solvent, the distillation of the raw reaction product in the presence of hydroquinone (Eb=93° C.-P=0.13 mbar) gives 9.31 g 3-acrylamidopropyldimethylamine (M=156.23 g/mol). Yield: 60%. The structure and the purity of the product are confirmed by NMR $^1$H (250 MHz-CDCl$_3$-TMS) δ7.74 (1H, s) 6.19 (2H, m) 5.59 (1H, dd, 9 Hz, 2.8 Hz) 3.39 (2H, q, 6.6 Hz) 2.38 (2H, t, 6.6 Hz) 2.22 (6H, s) 1.69 (2H, qt, 6.6 Hz).

2$^{nd}$ Stage

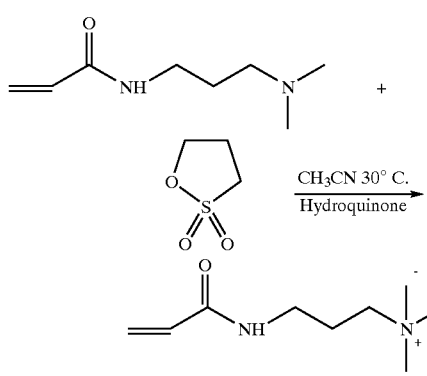

The solution of 6.2 g 3-acrylamidopropyldimethylamine (M=156.23 g/mol-39.7 mmol) and of 88 mg hydroquinone (M=110.11 mol/l-0.02 eq.) in 17 ml anhydrous acetonitrile is magnetically stirred at ambient temperature in an argon stream. The solution of 3.5 ml distilled propanesultone (M=122.14 g/mol-d=1.392-1 eq.) in 5 ml anhydrous acetonitrile is added drop by drop. A white precipitate appears. The suspension is stirred in an argon stream for 24 hours at ambient temperature. The precipitate is then filtered, washed with anhydrous acetonitrile, then with anhydrous acetone, and dried. 10.3 g 3-[(3-acrylamidopropyl) dimethylammonio]propanesulfonate (M=278.36 g/mol) are thus obtained. Yield: 93%. The purity of the product is controlled by elemental analysis: C: 47.27%; H: 7.88%; N: 10.41%; S: 11.55%, the percentages calculated from the empirical formula (C$_{11}$H$_{22}$N$_2$O$_4$S) being as follows: C, 47.46%, H: 7.97%, N: 10.06%; S, 11.52%.

The structure is confirmed by NMR $^1$H (400 MHz-D$_2$O-TSPd$_4$) δ6.27 (2H, m) 5.79 (1H, dd, 8.7 Hz, 2.9 Hz) 3.49 (2H, m) 3.40 (4H, m) 3.35 (6H, s) 2.99 (2H, t, 7.1 Hz) 2.22 (2H, qt, 7.1 Hz) 2.07 (2H, qt, 7.1 Hz).

The 3-[(3-acrylamidopropyl)dimethylammonio] propanesulfonate obtained has three intercharge methylenes. This distance can be modified by using other synthesis methods from 3-acrylamidopropyldimethylamine or from another tertiary amine carrying a polymerizable function.

The following can be mentioned by way of example:

- 2 intercharge methylenes: reaction of the tertiary amine function with alkenylsulfonyle chlorides (Wielema T. A.; Engberts J. B. F. N. *Eur. Polym. J.,* 1987, 23 (12), 947),
- 4 intercharge methylenes: replace the propanesultone by butanesultone (Hart R.; Timmerman D. J. *Polym. Sci.,* 1958, 28, 638),
- Intercharge distances corresponding to 5, 6 or 7 methylenes and one nitrogen atom: ring cleavage of a cycloiminiosulfonate formed by reaction of the propanesultone or of the butanesultone with 2-methyl-1, 3-oxazoline or 2-methyl-(4H)-5,6-dihydro-1,3-oxazine (Brunel S.; Chevalier Y.; Le Perchec P. *Tetrahedron,* 1989, 45 (11), 3363).

All these methods give salt-free products. Because of the absence of salts, the reaction medium shows a very high viscosity increase as the reaction progresses. This leads to a limitation of the proportion of zwitterions introduced in the copolymer of 40%. If it is desired to go fuirther, up to 100% zwitterions, it is necessary to introduce a certain salt concentration in the reaction medium for the various stages described above.

Example 2

Synthesis of 6-[(3-acrylamidopropyl) dimethylammonio]4-acetyl4-azahexanesulfonate

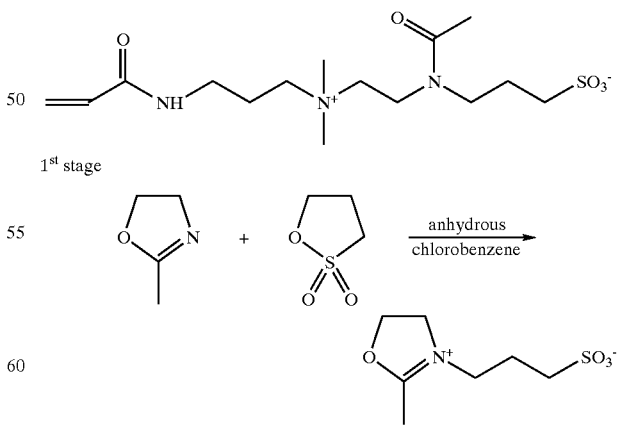

1$^{st}$ stage 6.96 g propanesultone (M=122.14 g/mol-57 mmol) and 5.82 g 1,3-oxazoline (M=85.11 g/mol-68 mmol-1.2 eq.) are dissolved in 38 ml chlorobenzene dried on alumina. The solution is stirred at ambient temperature in an argon stream for 48 hours. 5 ml cyclohexane are then added. The white precipitate formed is filtered in an argon stream, washed with cyclohexane and dried. 10.6 g 3-[(2-methyl)1,3-oxazolinium]propanesulfonate (M=207.24 g/mol) are thus obtained. Yield: 90%. The structure and the purity of the product are confirmed by NMR $^1$H (250 MHz-CD$_3$OD-TMS) δ4.95 (2H, t, 9.8 Hz) 4.21 (2H, t, 9.8 Hz) 3.92 (2H, t, 7.0 Hz) 2.91 (2H, t, 7.0 Hz) 2.49 (3H, s) 2.20 (2H, qt, 7.0 Hz).

2$^{nd}$ Stage

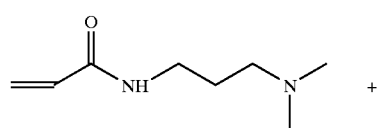

+

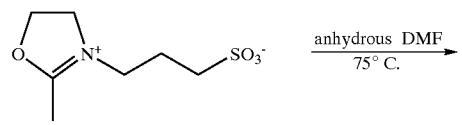

anhydrous DMF
75° C.

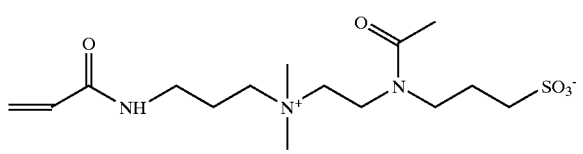

1 g 3-acrylamidopropyldimethylamine (M=156.23 g/mol-6.4 mmol), 1.33 g 3-[(2-methyl)1,3-oxazolinium] propanesulfonate (M=207.24 g/mol-6.4 mmol-1 eq.) and 35 mg hydroquinone (M=110.11 g/mol-0.05 eq.) are dissolved in 15 ml anhydrous dimethylformamide. The solution is stirred at 75° C. in an argon stream for 18 hours and poured into 150 ml anhydrous acetone. The precipitated product is filtered, washed with dichloromethane and dried. 2 g 6-[(3-acrylamidopropyl)dimethylammonio]4-acetyl4-azahexanesulfonate (M=363.47 g/mol) are thus obtained. Yield: 86%. The structure and the purity of the product are confirmed by NMR $^1$H (250 MHz-D$_2$O-TSPd$_4$) δ6.27 (2H, m) 5.79 (1H, dd, 8.7 Hz, 2.9 Hz) 3.78 (2H, t, 7.0 Hz) 3.57 (2H, t, 7.0 Hz) 3.32–3.48 (6H, m) 3.1 (6H, s) 2.95 (2H, t, 7 Hz) 1.9–2.25 (7H, m).

Example 3

Synthesis of 3-[(3-acrylamidopropyl)dimethylammonio]ethyl propanephosphonate

1$^{st}$ Stage

 150° C.

-continued

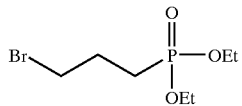

The mixture of 31 ml triethyl phosphite (M=166.16 g/mol-d=0.969–181 mmol) and of 128 ml 1,3-dibromopropane (M=201.89-d=1.989–7 eq.) is heated for one hour and a half at 150° C. The bromoethane obtained is recovered by condensation. The distillation of the excess 1,3-dibromopropane is followed by that of the ethyl 3-bromopropylphosphonate (Eb=73° C.-P=2.10$^{-3}$ mbar-M=259.08 g/mol), 34.1 g of which are thus obtained. Yield: 73%. The structure and the purity of the product are confirmed by NMR $^1$H (250 MHz-CDCl$_3$) δ4.06 (4H, m) 3.48 (2H, t, 6.3 Hz) 2.16 (2H, m) 1.90 (2H, m) 1.34 (6H, t, 7.0 Hz).

2$^{nd}$ Stage

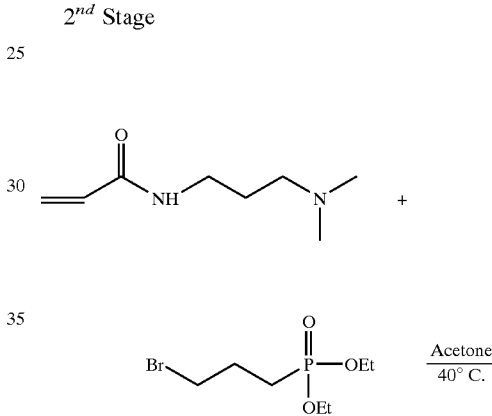

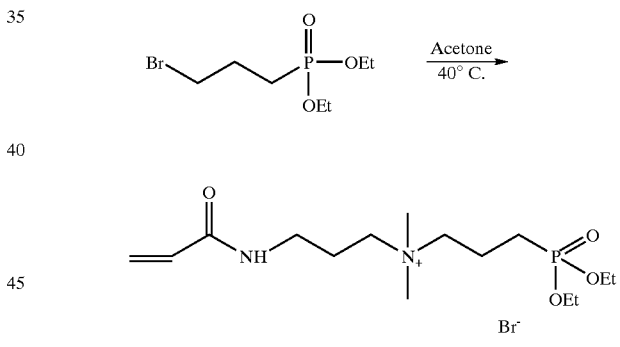

The solution of 2.34 g 3-acrylamidopropyldimethylamine (M=156.23 g/mol-15 mmol) and of 5.83 g ethyl 3-bromopropylphosphonate (M=259.08 g/mol-1.5 eq.) in 40 ml acetone is heated for 3 days at 40° C. 300 ml water are added thereafter and the acetone is evaporated. The excess ethyl 3-bromopropylphosphonate is eliminated by dichloromethane extraction. The bromide yield of diethyl 3-[(3-acrylamidopropyl)dimethylammonio]propanephosphonate (C$_{15}$H$_{32}$BrN$_2$O$_4$P-M=415.31 g/mol), obtained by measuring out the phosphorus in solution, is above 90%. The structure and the purity of the product are confirmed by NMR $^1$H (250 MHz-D$_2$O) δ6.24 (2H, m) 5.80 (1H, dd, 8.5 Hz, 2.9 Hz) 4.17 (4H, qt, 7.1 Hz) 3.40 (6H, m) 3.11 (6H, s) 2.02 (6H, m) 1.35 (6H, t, 7.1 Hz).

3$^{rd}$ Stage

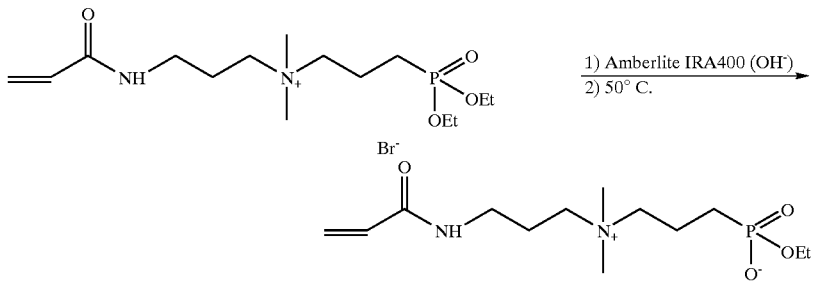

700 ml aqueous solution of diethyl 3-[(3-acrylamidopropyl)dimethylammonio]propanephosphate bromide (M=415.31 g/mol-C=71.4 mmol/l-50 mmol) are passed on Amberlite IRA400(OH) resin.

The aqueous solution of diethyl 3-[(3-acrylamidopropyl)dimethylammonio]propanephosphate hydroxide thus obtained is concentrated 10 times in a rotating evaporator, then heated to 50° C. for 12 hours. After distillation of the ethanol formed, determination of the phosphorus in solution shows that 12.7 g ethyl 3-[(3-acrylamidopropyl)dimethylammonio]propanephosphonate (M=306.34 g/mol) were obtained. Yield: 80%. The NMR $^1$H spectrum confirms the structure of the product and shows a purity above 95%. NMR $^1$H (250 MHz-$D_2O$) δ6.24 (2H, m) 5.80 (1H, dd, 8.9 Hz, 2.9 Hz) 3.93 (2H, qt, 7.1 Hz) 3.37 (6H, m) 3.10 (6H, s) 2.02 (4H, m) 1.63 (2H, dt, 16.5 Hz, 7.8 Hz) 1.27 (3H, t, 7.1 Hz).

NB: Side reactions are avoided through temperature and pH control.

II) Synthesis of Polyzwitterionic Copolymers

Examples 4 and 5

Copolymerization is Represented by the Following Reactions

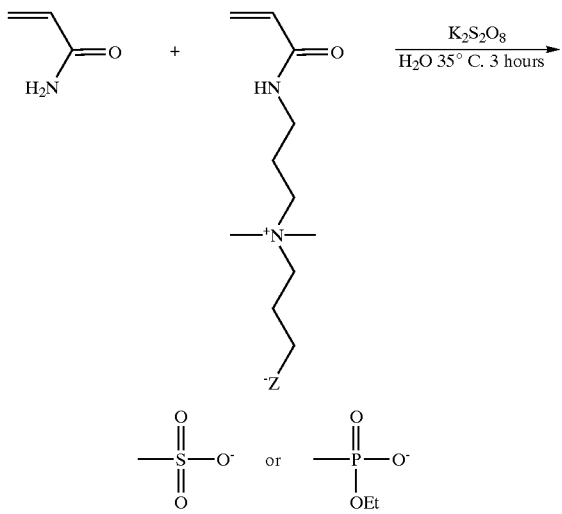

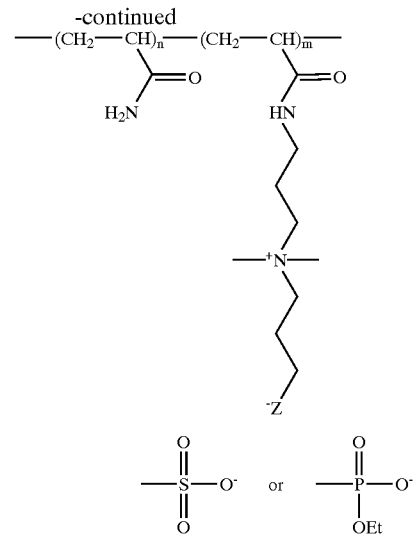

The copolymers:

- PSAM of 3-[(3-acrylamidopropyl)dimethylammonio]propanesulfonate (APS: synthesis according to example 1), or
- PPEAM of 3-[(3-acrylamidopropyl)dimethylammonio]propane ethyl phosphonate (APPE: synthesis according to example 3), with the acrylamide (AM) were prepared by radical polymerization in non-saline aqueous solution in an argon stream at 35° C. by using the 1% by mole potassium persulfate as the initiator, the total monomer concentration being 0.45 mol/l. The reaction is stopped after 3 hours, allowing a 80% conversion rate to be obtained. The copolymers, precipitated and washed in methanol, a good solvent for acrylamide and for the zwitterionic monomers used, show a high purity. Using a low copolymerization temperature allows to prevent any hydrolysis of the amide functions.

The molar mass can be adjusted by changing the amount of initiator or by using a transfer agent such as isopropanol for example. This synthesis method allows to obtain copolymers with at most 40% zwitterionic units. If the polymerization is carried out in an aqueous solution of sodium chloride for example, a polymer comprising up to 100% zwitterionic units can be obtained.

The reactivity ratios of the various monomers, obtained at high conversion by means of the graphic method developped by Tudos et al. (Tudos F.; Kelen T.; Foldes-Berezsnich T. and Turcsanyi B., *J Macromol. Sci.-Chem.*, 1916, A10 (8), 1513–1540), are given in the table hereunder:

|  | PPEAMm | PSAM |
| --- | --- | --- |
| $r_1$ (APS or APPE) | 0.25 | 1.26 |
| $r_2$ (AM) | 1.11 | 0.92 |
| $r_1 r_2$ | 0.28 | 1.16 |

In the case of PSAM polymers, the reactivity ratios are close to 1, which means that the copolymers are statistical copolymers.

Concerning PPEAM copolymers, $r_1$ is about 4 times less than $r_2$, which is close to 1. These products thus have a slight alternation tendency.

Examples of products obtained are described hereafter:

|  | % by mole of zwitterionic[a] units | $Mw^b$ in g/mol |
| --- | --- | --- |
| PSAM-5 | 5.2 | 1 330 000 |
| PSAM-5-2 | 4.9 | 408 000 |
| PSAM-1 | 1.6 | 1 190 000 |
| PSAM-10 | 10.5 | 1 400 000 |
| PPEAM-5 | 4.5 | 1 850 000 |
| PPEAM-1 | 0.8 | 890 000 |

[a]Determined from the elemental analysis: % Zwi = $[1/(n_N/n_S - 1)] * 100$ with $n_N$ and $n_S$ respectively the number of moles of nitrogen and of sulfur, $n_S$ being replaced by $n_P$ in the case of PPEAM copolymers.
[b]Determined by small-angle light scattering in an aqueous solution of NaCl 5g/l.

The figure immediately to the right of the name of the copolymer corresponds to the percentage of zwitterionic monomer in the reaction mixture.

Behaviour in Solution

Various products are compared; one of them, HPAM-5, is obtained by copolymerization of sodium acrylamide and acrylate, respectively 95 and 5% by mole.

and at velocity gradients ranging between $0.017$ s$^{-1}$ and $128$ s$^{-1}$. The reduced specific viscosity in ml/g is calculated according to the polymer concentration C in the solution. The intrinsic viscosity $[\eta]$ is obtained by extrapolation of the reduced specific viscosity at a zero polymer concentration. The slope of this extrapolation is $k'[\eta]^2$.

Influence of the Shear Gradient

The measurements were carried out by means of an imposed-velocity coaxial rheometre of Rheomat 30 type (Contraves).

|  | $\eta r$ at 0.1 s$^{-1}$ | $\eta r$ at 500 s$^{-1}$ | Loss in % |
| --- | --- | --- | --- |
| PAM | 900 | 90 | 90 |
| PSAM-5 | 170 | 90 | 47 |
| PPEAM-5 | 200 | 70 | 65 |

It can thus be seen that the viscosity loss at the highest shear gradients is less with the zwitterion derivatives than with the polyacrylamide. This is important for the formulation of drilling fluids because using these zwitterion derivatives allows the mud to keep its suspensive properties at the highest shear gradients.

Influence of the Ionic Strength

In the presence of monovalent ions, the partly hydrolyzed polyacrylamides follow an experimental law referred to as Pals law (Pals D. T. F. ; Hermans J. J., *Rec. Trav. Chim.*, 1952, 71, 433); their viscosity drops greatly with high salinities.

Comparatively, a neutral polyacrylamide is not very sensitive to salinity variations.

|  | $[\eta]$ (ml/g) | $[\eta]$ (ml/g) | $[\eta]$ (ml/g) | NaCl 0.1 M | | CaCl$_2$ 0.1 M | | CaCl$_2$ 1 M | |
| --- | --- | --- | --- | --- | --- | --- | --- | --- | --- |
|  | water | NaCl 0.1 M | NaCl 2.4 M | $[\eta]$ (ml/g) | k' | $[\eta]$ (ml/g) | k' | $[\eta]$ (ml/g) | k' |
| PAM | 597 | 671 | 730 | 671 | 0.56 | 698 | 0.5 | 792 | 0.44 |
| HPAM-5 | 6500* | 1625 | 1150 | 1625 | 0.4 | 940 | 0.68 | 1000 | 0.54 |
| PSAM-1 | 384 | 397 | 429 | 397 | 0.38 | 389 | 0.44 | 425 | 0.43 |
| PSAM-5 | 364 | 379 | 480 | 379 | 0.52 | 385 | 0.52 | 500 | 0.32 |
| PPEAM-1 | 250 | 255 | 274 | 255 | 0.38 | 257 | 0.38 | 284 | 0.36 |
| PPEAM-5 | 848 | 657 | 699 | 657 | 0.3 | 658 | 0.3 | 672 | 0.37 |

*NaCl $1.7 \cdot 10^{-3}$ M

|  | $Mw \times 10^{-6b}$ g/mol | $[\eta]$ ml/g | k' |
| --- | --- | --- | --- |
| PAM | 1.67 | 671 | 0.56 |
| HPAM-5 | 1.72 | 1625 | 0.40 |
| PSAM-1 | 1.19 | 397 | 0.38 |
| PSAM-5 | 1.33 | 379 | 0.53 |
| PPEAM-1 | 0.89 | 255 | 0.38 |
| PPEAM-5 | 1.85 | 657 | 0.30 |

The data are obtained in aqueous solution of NaCl 5 g/l, for a polymer concentration ranging between 0.5 and 15 g/l. The absolute viscosities of the solutions are measured by means of a Couette type Low Shear 30 (Contraves) at 30° C.

The introduction of zwitterionic units on a polyacrylamide chain allows to obtain a behaviour referred to as antipolyelectrolyte. In fact, unlike the partly hydrolyzed polyacrylamide with the same proportion of units, the viscosity remains constant, or it even increases at higher salinities. Furthermore, in the presence of divalent ions, a partly hydrolyzed polyacrylamide is in conditions referred to as bad solvent conditions (high k'), or even precipitates. On the other hand, an acrylamide/zwitterionic monomer copolymer remains a good solvent and does not precipitate. This will be shown with the aged samples in the following test.

Effect of the Temperature and of the pH Value

The study of the stability of the polymer solutions, of concentrations in NaCl 5 g/l ranging between 4.5 and 9 g/l according to products, was carried out at different temperatures and pH conditions, as a function of time, in a HP/HT cell with a 3-bar nitrogen back pressure. Deaeration of the solutions is performed by nitrogen stripping and allows to limit the oxygen content to proportions ranging between 5 and 50 ppb. After aging, the proportion of amide functions remaining on the copolymer chains is determined by means of the automatic Alliance<<Evolution 2>> bench. The hydrolysis ratio τ determined after aging corresponds to the proportion of amide functions hydrolyzed to carboxylate functions.

natural pH, 120° C., 50 ppb $O_2$, NaCl 5 g/l:
Influence of the aging time:

|  | t = 0 | | | t = 1 day | | | t = 4 days | | | t = 7 days | | |
|---|---|---|---|---|---|---|---|---|---|---|---|---|
|  | % τ | [η] | k' | % τ | [η] | k' | % τ | [η] | k' | % τ | [η] | k' |
| PAM | 0 | 671 | 0.56 | 28 | 1070 | 0.26 | 73 | 1390 | 0.19 | 86 | 690 | 0.17 |
| PSAM-5 | 0 | 379 | 0.53 | 27 | 810 | 0.36 | 53 | 540 | 0.19 | 68 | 500 | 0.10 |
| PPEAM-5 | 0 | 657 | 0.30 | 34 | 1100 | 0.26 | 66 | 540 | 0.22 | 80 | 680 | 0.23 |

The intrinsic viscosities ([η]) are expressed in ml/g.

The intrinsic viscosities ([η]) are expressed in ml/g.

pH 13, 80° C., NaCl 5 g/l, without preliminary $O_2$ elimination:
Influence of the aging time:

|  | t = 14 h | | | t = 24 h |
|---|---|---|---|---|
|  | % τ | [η] in ml/g | k' | % τ |
| PAM | 68 | 2500 | 0.15 | 77 |
| PSAM-5 | 48 | 1470 | 0.15 | 60 |
| PPEAM-5 | 59 | 2260 | 0.15 | 71 | pH 13, NaCl 5 g/l, 14 hours without preliminary $O_2$ elimination:
Influence of the temperature

|  | % τ at 5° C. | % τ at 30° C. | % τ at 80° C. |
|---|---|---|---|
| PAM | 9 | 38 | 68 |
| PSAM-5 | 6 | 31 | 48 |
| PPEAM-5 | 10 | 43 | 59 | pH 11, NaCl 5 g/l, 24 hours without preliminary $O_2$ elimination:
Influence of the temperature

|  | % τ at 5° C. | % τ at 80° C. |
|---|---|---|
| PAM | 10 | 16 |
| PSAM-5 | 0 | 4 |
| PPEAM-5 | 0 | 4 |

80° C., NaCl 5 g/l, 24 hours without preliminary $O_2$ elimination:

Influence of the pH value:

|  | % τ at natural pH | % τ at pH 11 | % τ at pH 13 |
|---|---|---|---|
| PAM | 16 | 16 | 77 |
| PSAM-5 | 3 | 4 | 60 |
| PPEAM-5 | 4 | 4 | 71 |

Certain amide functions have been hydrolyzed: the viscosimetric study shows an anionic polyelectrolyte type behaviour: the carboxylate functions of the acrylate units provide excess negative charges. Thus, the intrinsic viscosity increases with the increase of the proportion of carboxylate functions. However, this variation, tempered by the presence of the zwitterionic functions, is less spectacular than with a polyacrylamide.

Sensitivity of the Aged Polymers to Calcium

The aforementioned aged polymers have been given the reference numbers as follows:

|  | 120° C. 50 ppb $O_2$ pH 7 NaCl 5 g/l | | | pH 13 with $O_2$ NaCl 5 g/l 14 h | |
|---|---|---|---|---|---|
|  | 1 day | 4 days | 7 days | 5° C. | 80° C. |
| PSAM-5 | 47V1 | 47V2 | 47V4 | 47B7 | 47V7 |
| PPEAM-5 | 54V1 | 54V2 | 54V4 | 54B7 | 54V7 |
| PAM | 60V1 | 60V2 | 60V4 | 60B7 | 60V7 |

The pH value of the samples from the 7 series (B7 and V7) is adjusted to 8 after aging.

The test is then carried out as follows:

A solution of $CaCl_2$ 2M is added to the polymer solutions of concentration 1.5 g/l under stirring at ambient temperature until it turns cloudy. In all the cases, addition is continued in order to check that there is no resolution of the precipitated polymer. When the volume of solution added reaches 5% of the initial volume of polymer solution without turning cloudy, dihydrated powdered $CaCl_2$ is added directly in order to check the stability of the product towards calcium ions at high concentration while avoiding any polymer dilution. The curve of the critical $CaCl_2$ concentration (cloud point) as a function of the hydrolysis ratio allows the following remarks:

At comparable hydrolysis ratios, the zwitterionic compounds precipitate at higher calcium ion concentrations than the hydrolyzed polyacrylamide (47V4 in relation to 60V7 and 54V4 in relation to 60V2). Thus, the zwitterionic units have withstood aging, a result that is confirmed on certain series by NMR $^1$H and $^{13}$C and their presence at 5% only limits the sensitivity to calcium ions, even at carboxylate contents above 67%.

The table hereunder sums up the critical $CaCl_2$ concentrations leading to precipitation of the polymers after aging. The other samples do not precipitate in the 5 presence of $Ca^{++}$.

| Sample | Hydrolysis ratio | Critical [CaCl$_2$] (mol/l) |
|---|---|---|
| 47V4 | 68 | 0.058 |
| 60V7 | 68 | 0.053 |
| 60V2 | 73 | 0.030 |
| 54V4 | 80 | 0.050 |
| 60V4 | 87 | 0.020 |

Adsorption on a Sodic Homoionic Clay

The adsorption is measured by means of the remainder method after contacting for 18 hours a polymer solution of known concentration with a suspension of sodic homoionic montrnorillonite. The tests are carried out at ambient temperature, pH 8, NaCl 20 g/l, S/L 3.6. $10^{-4}$ g/ml.

The adsorption plateau corresponds to the maximum amount of polymer adsorbed on the clay.

|  | Max. adsorption (mg/g) |
|---|---|
| PAM | 480 |
| HPAM-5 | 250 |
| PSAM-1 | 400 |
| PSAM-5 | 670 |
| PSAM-10 | 650 |
| PSAM-5-2 | 620 |
| PPEAM-5 | 710 |

The adsorption level of the polymers thus prepared is higher than that of the conventional acrylamide derivative. The 5% proportion of zwitterion units seems to be optimum in terms of adsorption; the role played by the molar mass is furthermore almost negligible.

Filtration Properties

Comparison of the efficiency of the PSAM-5 polymer with conventional filtrate reducers, for calcite-base fluids.

a) Conditions: API standard and at ambient temperature (25° C.).

FB base formulation: xanthan 4 g, Hymod Prima (HMP) 28.5 g/l, NaCl 20 g/l, KCl 20 g/l and Calcite (IDCARB 75) 360 g/l for a final density of 1.2. The pH value is adjusted at 9.5 by 2N soda.

The plastic viscosity is expressed in centipoise (cP), the yield value (YV) is expressed in pounds/100 square ft, the 30' filtrate in milliliter (ml), the cake thicknesses in millimeter (mm), the cake permeability in millidarcy (mD) and the organic carbon in mg/l (or ppm). The Cpf to Cplm ratio expresses the ratio of the polymer concentration in the filtrate at plateau level to the free polymer concentration in the initial mixture.

The free polymer concentration in the initial mixture is obtained after centrifugation of the formulation and it is determined by means of a carbon analyzer. The filtrates are measured out by means of the same analyzer.

The IDVIS xanthan and the low-viscosity CMC used are marketed by the DOWELL-IDF company; the HOSTADRILL is marketed by the HOECHST company. The HMP is a filler clay simulating contamination of the formulation by cuttings.

Remarks: The filtration characteristics with the copolymer are of the same order as those of the low-viscosity CMC and lower than those of the HOSTADRILL for identical rheological characteristics. The organic carbon concentrations are about 6 times less than those obtained with commercial filtrate reducers and, among other things, for an initial polymer concentration similar to that of the formulation containing the HOSTADRILL. Despite very low <<( 30-minute>> filtrates concerning the formulation based on low-viscosity CMC, a large amount of organic carbon remains in the filtrate, unlike the formulation containing the copolymer described here.

b) Conditions: API standard, in a HP/HT test cell with a pressure of 50 bars and a back pressure of 15 bars (dP=35 bars), temperature 110° C.

FB base formulation: xanthan 4 g/l, Hymod Prima (HMP) 28.5 g/l, NaCl 20 g/l, KCl 20 g/l and Calcite (IDCARB 75) 360 g/l for a final density of 1.2. The pH value is adjusted at 9.5 by means of 2N soda.

| Additive to FB | Filtrate 30' | VP | YV | Cake at 120' | Cake permeability at 120' (at $P_{atm}$) | Org. carbon at plateau level | Cpf/Cplm |
|---|---|---|---|---|---|---|---|
| Low-visc. CMC 10 g/l | 3.3 | 17 | 18 | 1 | 0.0003 | 800 | 0.23 |
| HOSTADRILL 5 g/l | 6.7 | 15 | 24 | 1.5 | 0.00095 | 780 | 0.32 |
| PSAM-5 5 g/l | 4.4 | 16 | 28 | 1.3 | 0.0006 | 140 | 0.055 |

| Additive to FB | Filtrate 30' | VP | YV | Cake at 120' | Cake permeability at 120' (at $P_{atm}$) | Org. carbon at plateau level | Cpf/Cplm |
|---|---|---|---|---|---|---|---|
| | Filtration temperature: 110° C. | | | | | | |
| Low-visc. CMC 10 g/l | 8 | 17 | 18 | — | — | — | — |
| HOSTADRILL 5 g/l | 40.1 | 15 | 24 | 5.5 | 0.0012 | 1600 | 0.63 |
| PSAM-5 5 g/l | 22.4 | 16 | 28 | 4 | 0.00044 | 400 | 0.16 |

Remarks: The formulation containing the low-viscosity CMC is degraded during the heating period preceding filtration (about 1 hour) and no cake formation is observed. At this density, the formulation containing the copolymer gives a cake that is not very permeable, unlike the formulation containing the HOSTADRILL, which gives a lower <<30-minute>> filtrate and an organic carbon concentration that is 4 times lower. The free polymer drop in the filtrate can be observed, which is linked with the presence of the copolymer in this type of formulation.

What is claimed is:

1. Hydrosoluble copolymers of substituted acrylamide or acrylate and of zwitterion monomers, characterized in that the general structure thereof is as follows:

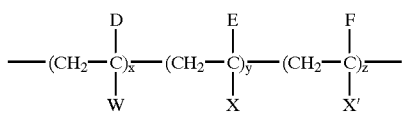

W is a $CONH_2$ or CONHR or CONRR' or $COO^-$ or COOR" group, where R, R' and R" are linear or branched aliphatic radicals, D, E, F are an atom of hydrogen or a methyl group, X and X' correspond to one of the following two formulas:

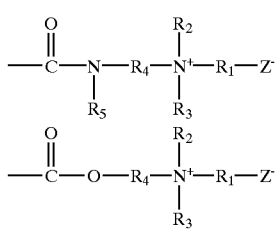

$R_2$ and $R_3$ are each a monovalent hydrocarbon radical, $R_1$ is a divalent organic group comprising a linear chain consisting of carbon atoms, containing 3 to 12 carbon atoms in linear chain, optionally interrupted by 1 nitrogen atom carrying an amide function or 1 to 3 oxygen atoms and optionally comprising alkyl or hydroxyl substituents, $R_4$ is a linear or branched aliphatic group and $R_5$ a hydrocarbon radical, $Z^-$ meets at least one of the following formulas corresponding to sulfobetaines and phosphobetaines respectively:

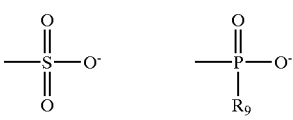

$R_9$ is a methyl, phenyl or alkoxy radical, and in that at least the sulfobetaines are synthesized in the absence of salts, x, y, z molar percentage and y+z not equal to zero and y+z at most equal to 40% in relation to x+y+z.

2. Copolymers as claimed in claim 1, characterized in that, in the case of sulfobetaines, $R_1$ corresponds to one of the following two formulas:

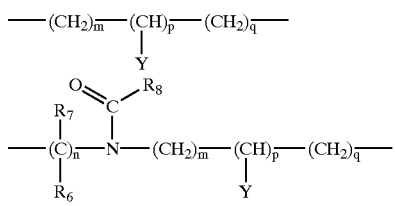

wherein $R_6$ and $R_7$ represent each a substantially hydrocarbon radical and $R_8$ a hydrogen atom or a hydrocarbon radical; n, m, p, q integers, n is 2 or 3; Y is a methyl or hydroxyl group; p is 0 or 1.

3. Copolymers as claimed in claim 2, wherein Y is a hydroxyl group, p is 1, m is 1 and q is 1.

4. Copolymers as claimed in claim 2, wherein Y is a methyl group, p is 1, m is 2 and q can be 0 or 1.

5. Copolymers as claimed in claim 2, wherein p is 0, and the sum m+q is 2, 3 or 4.

6. Copolymers as claimed in claim 1, characterized in that, in the case of phosphobetaines, $R_1$ corresponds to one of the following four formulas:

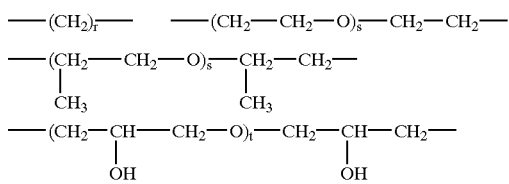

r is an integer that can range from 3 to 12, s is an integer that can range from 1 to 3 and t is an integer that can be 1 or 2.

7. Copolymers as claimed in claim 1, wherein the zwitterionic monomer is:

3-[(3-acrylamidopropyl)dimethylammonio]
propanesulfonate (PSAM).

8. Copolymers as claimed in claim 7, wherein said zwitterionic monomer has a molecular mass ranging between 400 000 and 1 400 000 g/mol and a molar ratio of zwitterionic units ranging between 1.6 and 10.5%.

9. Copolymers as claimed in claim 6, wherein the zwitterionic monomer is:
3-[(3-acrylamidopropyl)dimethylammonio]ethyl propane phosphonate (PPEAM).

10. Copolymers as claimed in claim 9, wherein the zwitterionic monomer has a molar mass ranging between 890 000 and 1 850 000 g/mol and a molar ratio of zwitterionic units ranging between 0.8 and 4.5%.

11. Water-base fluid comprising the polymer as claimed in claim 1 used as a viscosifying agent.

12. Application of the fluid as claimed in claim 11 to drilling fluids in high-temperature wells.

13. Process for obtaining monomers and copolymers as claimed in claim 1, wherein synthesis takes place without salts.

* * * * *